United States Patent [19]

Okubo et al.

[11] Patent Number: 5,059,364
[45] Date of Patent: Oct. 22, 1991

[54] INJECTION-COMPRESSION MOLDING MACHINE AND METHOD OF MOLDING BY USING THE MACHINE

[75] Inventors: Hideaki Okubo; Kan-ichi Sato; Kazuhiro Mimura; Satoshi Fujimoto, all of Hiratsuka; Makoto Higuchi, Komatsu, all of Japan

[73] Assignee: Kabushiki Kaisha Komatsu Seisakusha, Tokyo, Japan

[21] Appl. No.: 445,636

[22] PCT Filed: Mar. 24, 1989

[86] PCT No.: PCT/JP89/00315
§ 371 Date: Jan. 5, 1990
§ 102(e) Date: Jan. 5, 1990

[87] PCT Pub. No.: WO89/09124
PCT Pub. Date: Oct. 5, 1989

[30] Foreign Application Priority Data

Mar. 24, 1988 [JP] Japan .................... 63-70077

[51] Int. Cl.$^5$ .................... B29C 45/70; B29C 45/77
[52] U.S. Cl. .................... 264/40.1; 264/40.5; 264/328.7; 425/145; 425/147; 425/150
[58] Field of Search .................... 264/40.1, 40.5, 328.7, 264/328.11; 425/135, 145, 147, 150, 166

[56] References Cited

U.S. PATENT DOCUMENTS 3,787,159  1/1974  Bielfeldt .
4,855,095  8/1989  Sato .................... 264/40.5

FOREIGN PATENT DOCUMENTS

| 21225 | 2/1985 | Japan . |
| 110419 | 6/1985 | Japan . |
| 62-20010 | 5/1987 | Japan . |
| 62-225318 | 10/1987 | Japan . |
| 13727 | 1/1988 | Japan . |
| 27228 | 2/1988 | Japan . |

Primary Examiner—Jill L. Heitbrink
Attorney, Agent, or Firm—Ronald P. Kananen

[57] ABSTRACT

A method of molding a plastic resin having for its object to enable the filling or spreading speed of a molten resin in a mold to be controlled in compliance with the shape of an article to be molded by changing the opening and closing speed of the mold or the injecting speed of the molten resin in an injection unit in compliance with the amount of the molten resin charged into the mold or the amount of the molten resin injected by the injection unit so that a stable molded article can be produced in a short time even in case the shape of a product to be molded is changed, and an injection-compression molding machine constructed to achieve the molding method. This injection-compression molding machine has a compression unit (21) for clamping the mold, an injection unit (10) for injecting the molten resin into the mold, a detector (25a) for detecting the stroke of the compression unit, a detector (26a) for detecting the opening and closing speed of the mold, input component (25b, 26b, 16b) for setting inputs of the stroke of the compression unit, the opening and closing speed of the mold, and the injecting speed, respectively, a controller (40) including an interface (45), a compression unit driving component (21c), and an injection unit driving component (14c).

9 Claims, 8 Drawing Sheets

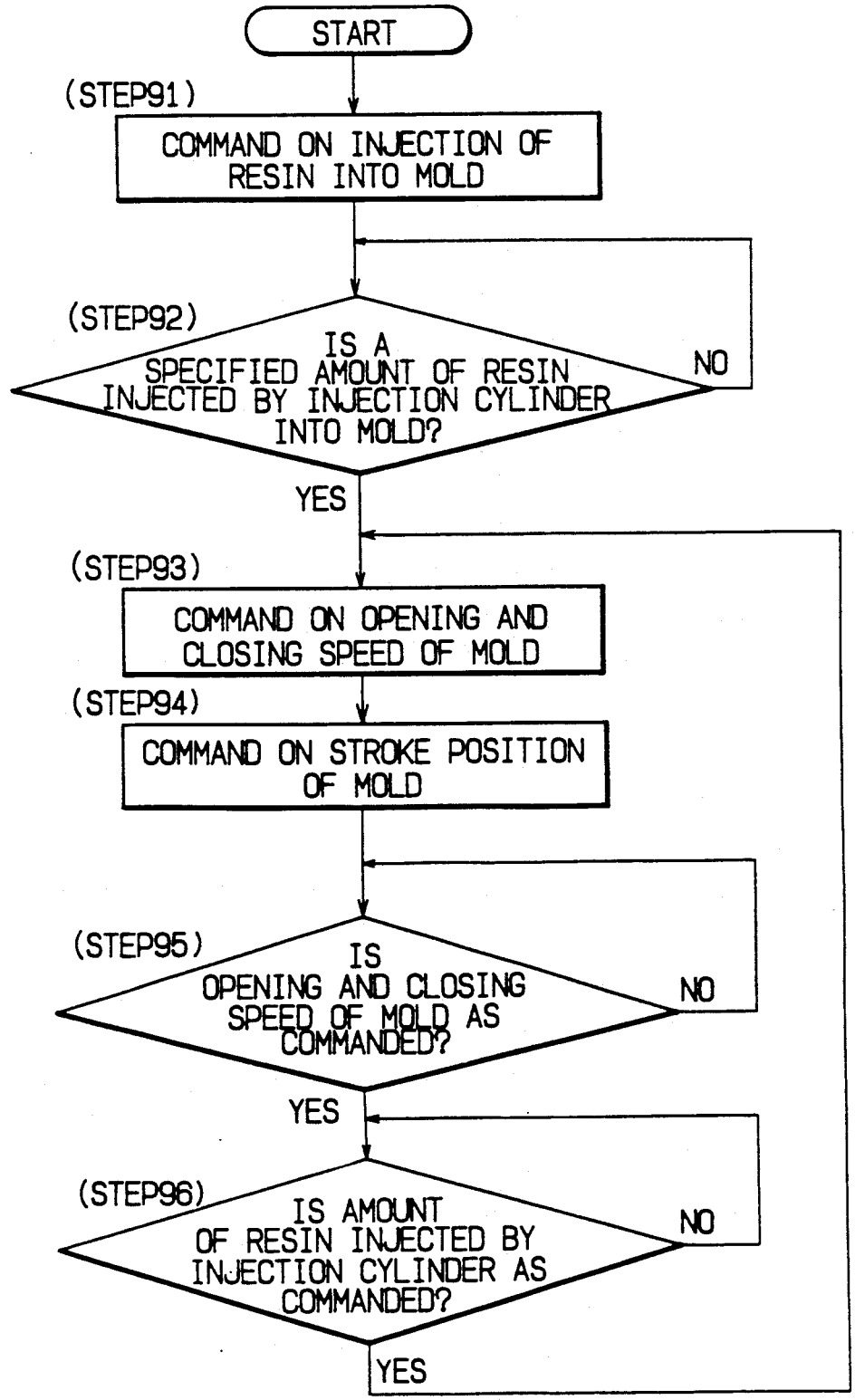

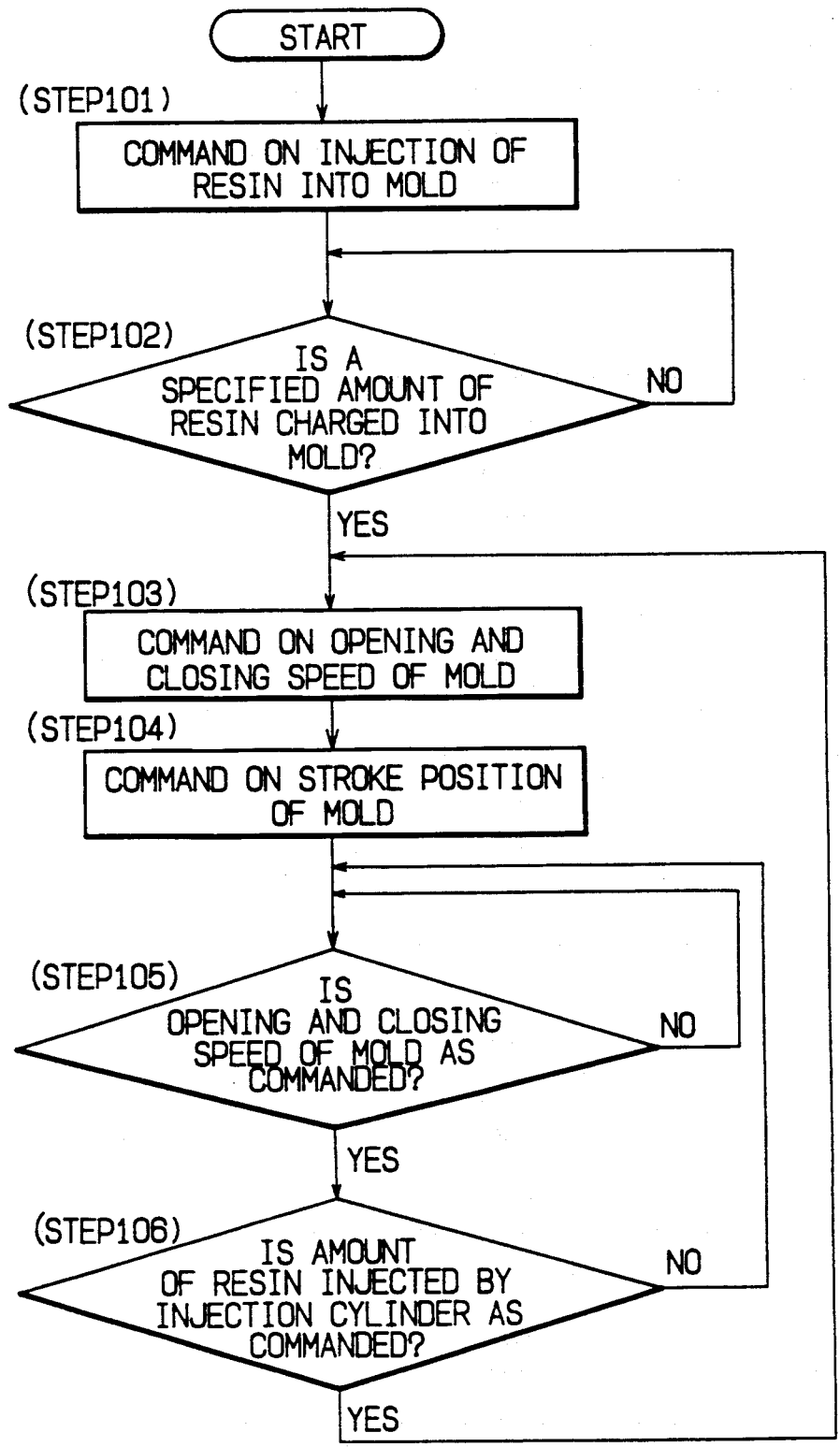

INJECTION-COMPRESSION MOLDING MACHINE AND METHOD OF MOLDING BY USING THE MACHINE

TECHNICAL FIELD OF THE INVENTION

This invention relates to an injection-compression molding machine for molding a plastic resin and a method of molding by using the molding machine.

BACKGROUND TECHNIQUE OF THE INVENTION

The conventional method of molding by using a compression molding machine as disclosed, for example, in the specifications and drawings of Japanese Laid-open Specification Nos. SHO 60-21225 and SHO 60-110419 of Japanese Patent Applications, respectively, is conducted by charging a plastic resin material to be molded into a heated mold, actuating the molding machine thereby pressuring the material at a low pressure to fill the mold with the resultant molten resin, and then opening the upper and lower molds once slightly to vent the gaseous matter present in the material, pressurizing the material again at a high pressure, continuing the pressurizing and the heating until the material has been cured, and then opening the mold and taking out the molded article. Whilst, in the method of injection and compression molding, when a molten resin material is injected into a mold, the injection flow rate and the injecting speed of the molten resin are controlled by the moving speed and the pressing force of a screw.

In the above-mentioned conventional compression molding method, however, since the resin to be molded is subjected in turn to a low pressure and a high pressure, the number of the processes is increased, and also since after the mold is filled with the resin it is subjected to a predetermined pressure, there is a tendency of molded articles undergoing shrink marks or warping.

Further, in the method of molding by using the injection-compression molding machine, a molten resin is injected into a mold in such a manner that the moving speed and the pressure of the screw is varied with the shape of the mold used and that of an article to be molded. In this case, since the flow speed of the molten resin will change in compliance with the shape of the mold and that of an article to be molded, the mold can not be filled uniformly with the molten resin with the result that the molded articles tend to have defects such as haze weld lines, flow marks and entrap gases.

SUMMARY OF THE INVENTION

The present invention has been made in view of the above-mentioned circumstances, and has for its object to provide an injection-compression molding machine and a method of molding by using the molding machine wherein the injecting speed and the injection flow-rate of a molten resin by the injection unit can be varied in compliance with the filling speed (or spreading speed) of the molten-resin within the mold and/or the injecting speed of the molten resin can be varied in compliance with the filling speed so that, when the molten resin injected by the injection unit into the mold may fill the latter so as to spread therein as it is compressed in the mold by a mold compression unit, the mold can be filled uniformly with the molten resin.

To achieve the above-mentioned object, according to a first aspect of the present invention, there is provided an injection-compression molding machine having a compression unit for clamping a mold and an injection unit for injecting a molten resin into the mold, the molding machine comprising a means for detecting the stroke of the compression unit; a means for detecting the injecting speed of the injection unit; an input means for setting the stroke of the compression unit; an input means for setting the injecting speed of the injection unit; a stroke signal generator means for converting the detected stroke of the compression unit into a stroke signal corresponding to a value present by the stroke setting input means; a means for generating an injecting speed signal for the injection unit in response to the stroke signal; and an injection unit driving means adapted to be actuated in response to the injecting speed signal.

To achieve the above-mentioned object, according to a second aspect of the present invention, there is provided an injection-compression molding machine having a compression unit for clamping a mold and an injection unit for injecting a molten resin into the mold, the molding machine comprising: a means for detecting the stroke of the compression unit; a means for detecting the opening and closing speed of the mold; an input means for setting stroke of the compression unit; an input means for setting the opening and closing speed of the mold; a stroke signal generator means for converting the detected stroke of the compression unit into a stroke signal corresponding to a value preset by the stroke setting input means; a means for generating an opening and closing speed signal for the mold in response to the stroke signal, and a compression unit driving means adapted to be actuated in response to the mold opening and closing speed signal.

To achieve the above-mentioned object, according to a third aspect of the present invention, there is provided an injection-compression molding machine having a compression unit for clamping a mold and an injection unit for injecting a molten resin into the mold, the molding machine comprising: a means for detecting the injecting speed of the injection unit; a means for detecting the opening and closing speed of the mold; an input means for setting the injecting speed of the injection unit; an input means for setting the opening and closing speed of the mold; an injecting speed signal generator means for converting the detected injecting speed of the injection unit into an injecting speed signal corresponding to a value preset by the injecting speed setting input means; a means for generating an opening and closing speed signal for the mold in response to the injecting speed signal; and a compression unit driving means adapted to be actuated in response to the mold opening and closing speed signal.

To achieve the above-mentioned object, according to a fourth aspect of the present invention, there is provided a method of molding a plastic resin by using the injection-compression molding machine according to the first aspect, comprising the steps of detecting the amount of the molten resin injected into the mold in the compression unit, and changing the injecting speed of the molten resin to be injected by the injection unit into the mold in compliance with the detected amount of the molten resin.

To achieve the above-mentioned object, according to a fifth aspect of the present invention, there is provided a method of molding a plastic resin by using the injection-compression molding machine according to the second aspect, comprising the steps of detecting the amount of the molten resin injected into the mold in the compression unit, and changing the opening and closing speed of the mold in compliance with the detected, amount of the molten resin.

To achieve the above-mentioned object, according to a sixth aspect of the present invention, there is provided a method of molding a plastic resin by using the injection-compression molding machine according to the third aspect, comprising the steps of detecting the injecting speed of the molten resin by the injection unit, and changing the opening and closing speed of the mold in compliance with the detected injecting speed.

According to the above-mentioned injection compression molding machine having the above-mentioned aspects incorporated and the method of molding by using the molding machine, since the filling speed (or spreading speed) of the molten resin in the mold is controlled by the injecting speed (or the injection flow rate) of the molten resin and/or the opening and closing speed of the mold which are determined by the stroke of the compression unit matching the shape of an article to be molded, a molded article of a stable quality which is free from surface defects has little residual stress and which has limited deviation in thickness and can be obtained in a short time with excellent transfer of configurations on the metallic surface of the mold to the molded article.

The above-mentioned and other objects, aspects and advantages of the present invention will be apparent to those skilled in the art by making reference to the following description and the accompanying drawings in which preferred embodiments incorporating the principles of the present invention are shown by way of example only.

BRIEF DESCRIPTION OF THE DRAWINGS

FIGS. 7, 8 and 9 are flow chart showing third, fourth and fifth embodiments of the method of molding according to the present invention.

DETAILED DESCRIPTION OF THE PREFERRED EMBODIMENTS

The present invention will now be described below with reference to the accompanying drawings in which preferred embodiments of the present invention are shown.

Figure 1:
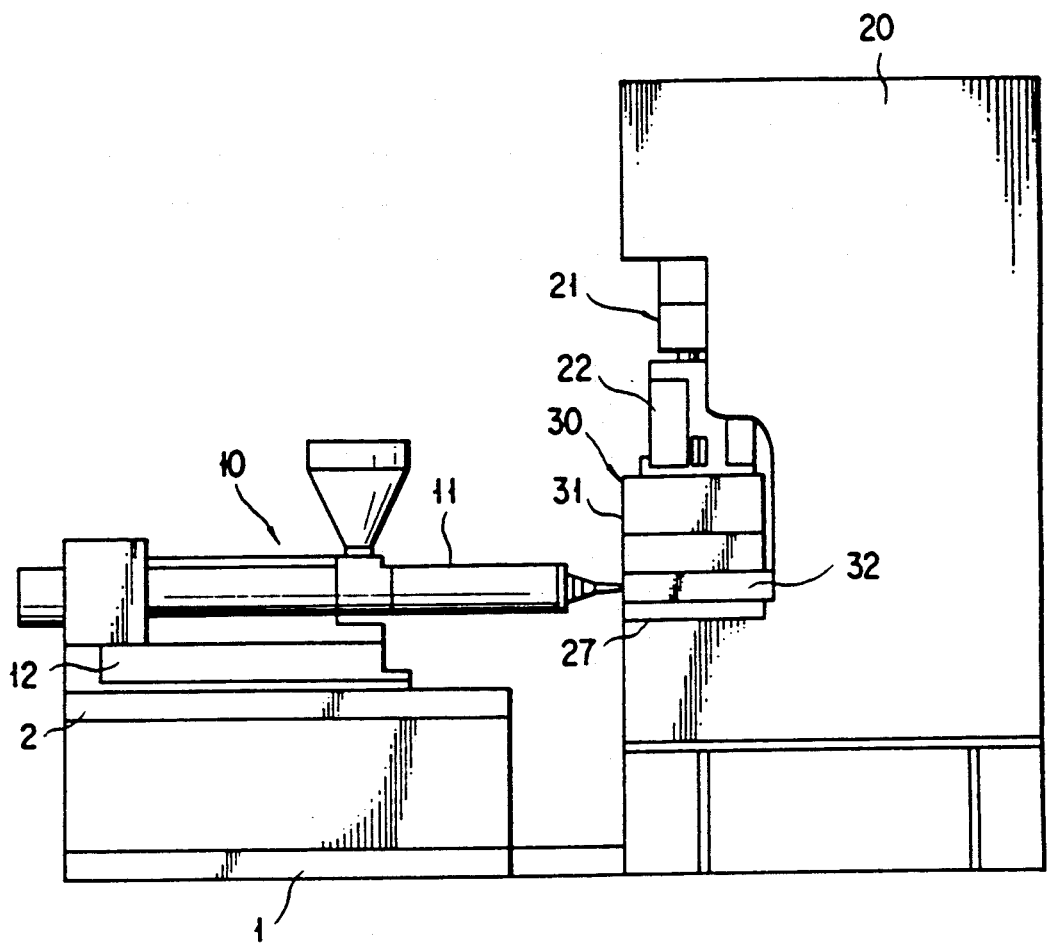
FIG. 1 is a schematic front view showing the overall arrangement of an injection-compression molding machine according to the present invention.

FIG. 1 is an overall constructional view showing one embodiment of the injection-compression molding machine according to the present invention. In FIG. 1, reference numeral 1 denotes an injection-compression molding machine, 10 an injection unit, 20 a press provided with a compression unit 21, and 30 a mold.

The injection unit 10 is slidably mounted on a bed 2 of the injection-compression molding machine 1 through a slider 12 fixedly secured to an injection cylinder 11. The mold is made up of an upper mold 31 and a lower mold 32. The upper mold 31 is fixedly secured to a slide 22 of the compression unit 21 of the press 20, whilst the lower mold 32 is fixedly secured to a bed 27. A plastic resin within the mold 30 is pressurized by the depressing force developed by the slide 22, and also the opening and closing speed of the mold 30 is associated with the speed of the slide 22.

Figure 2:
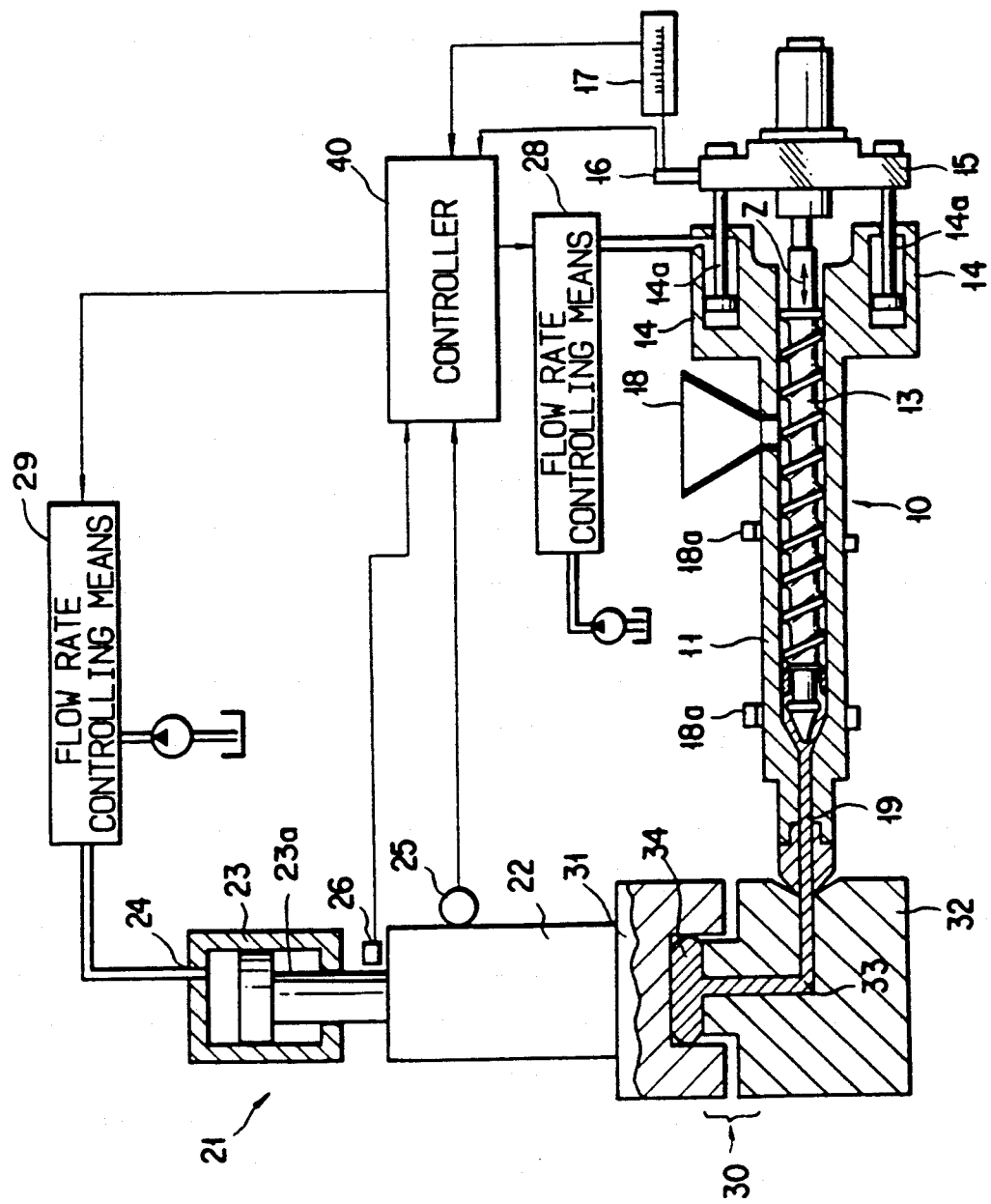
FIG. 2 is an explanatory view including in combination a schematic longitudinal sectional view showing the arrangement of principal parts of the injection-compression molding machine according to the present invention, and a block diagram thereof.

In FIG. 2, a screw 13 is mounted closely within the injection cylinder 11 of the injection unit 10. Further, this screw 13 is connected to a pair of pistons 14a within corresponding cylinders 14 through a bracket 15 so that it may be slidably moved in the directions shown by reference character Z when the pistons 14a within the cylinder 14 are driven thereby injecting the molten resin.

The speed of sliding movement of the screw 13 which is proportionate to the injecting speed of the molten resin by the injection unit 10 is controlled by the discharge rate of pressurized fluid which is controlled by a flow rate controlling means 28 or a variable displacement pump, not shown, and is measured by means of a speed sensor 16. Further, the position of the screw 13 is measured by means of a position sensor such as, for example, a potentiometer 17 or the like so that measurement of the injection speed (or amount of injection) of the molten resin can be made.

A plastic resin is thrown through or supplied from a hopper 18 into the injection cylinder 11, and is fused by the action of a heater 18a. The molten resin is pressurized by the screw 13 so that it may be injected through a flow passage 19 into the lower mold 32. The mold 30 has a flow passage 33 formed in the lower mold 32 and which leads to a product molding portion 34. One side of the product molding portion 34 is formed by the lower mold 32, and the other side thereof is formed by the upper mold 31 located opposite to the lower mold 32. The arrangement is made such that the inner space or volume of the product molding portion 34 may be expanded and contracted by the vertical movement of the upper mold 31. The relative opening and closing speed of the upper and lower molds and the pressure of the molten resin introduced into the product molding portion 34 are determined by the moving speed and the depressing force of the upper mold 31. The moving speed and the depressing force of the upper mold 31 are controlled by the moving speed and the extruding force of a piston 23a mounted in a hydraulic cylinder 23 for driving the compression unit 21 of the press 20 having the upper mold 31 mounted thereon. The moving speed and the extruding force of the piston 23a depend in turn on the controlled flow rate and the pressure of the fluid under pressure in a hydraulic circuit having a flow rate controlling means 29 incorporated therein.

The slide 22 of the compression unit 21 is fitted with a potentiometer 25 and a speed sensor 26, which detect the stroke position and the moving speed of the slide 22, respectively.

Figure 3:
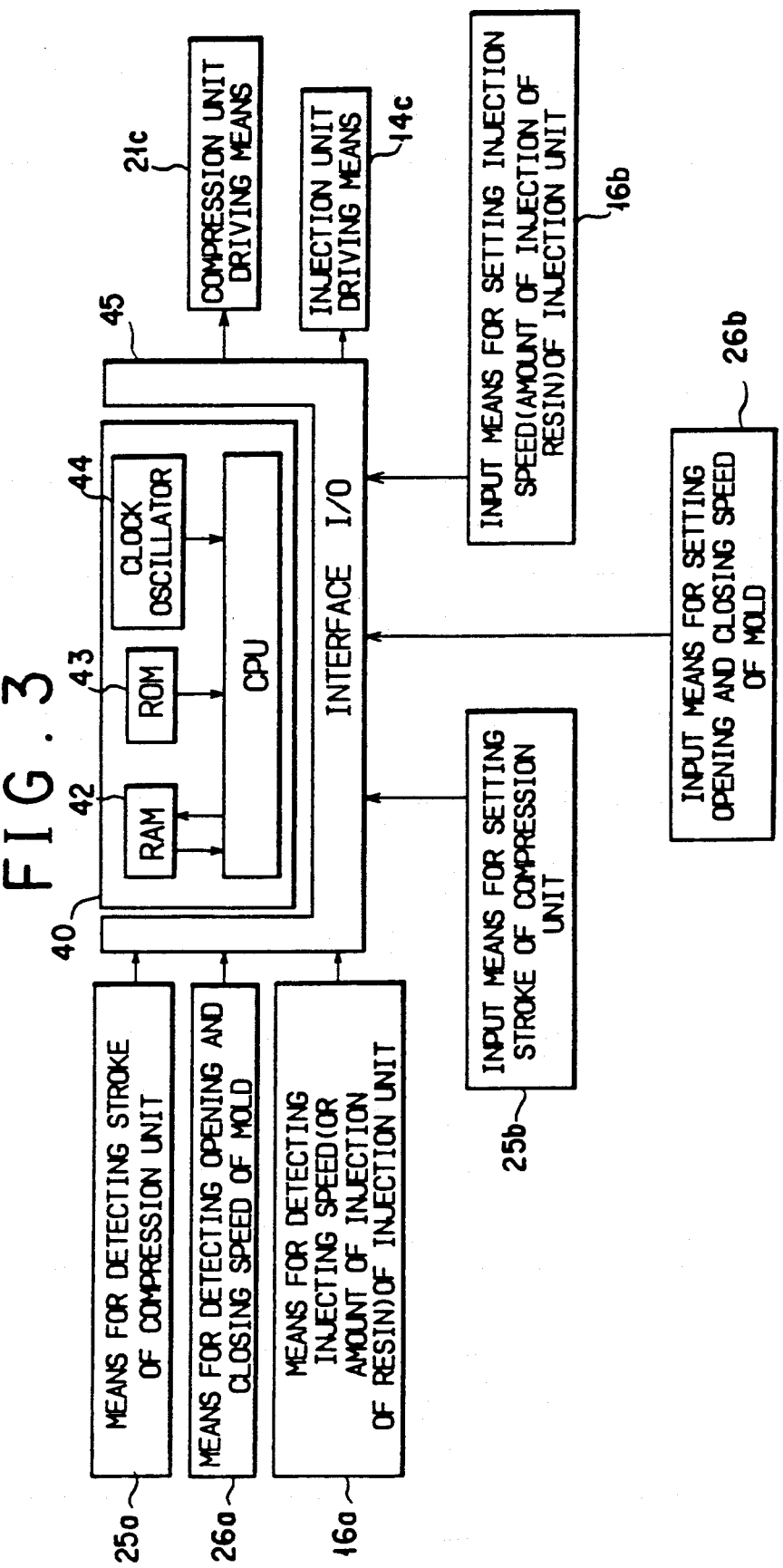
FIG. 3 is a block diagram showing a controlling system for the injection-compression molding machine according to the present invention.

In FIG. 3, a controller 40 comprises a CPU 41, a RAM 42, a ROM 43 and a clock oscillator 44. The controller 40 is further provided through an interface 45 with a means 16a for detecting the injecting speed of the injection unit 10 which consists of the speed sensor 16, etc. for measuring the moving speed of the screw 13 mounted within the cylinder 11, a means 26a for detecting the opening and closing speed of the mold which consists of the speed sensor 26, etc. for measuring the opening and closing speed of the mold 30, and a means 25a for detecting the stroke of the compression unit which consists of the potentiometer 25, etc. for measuring the stroke position of the mold 30. The controller 40 is yet further provided through the interface 45 with an input means 16b for setting the injecting speed (or amount of injection) of the injection unit 10 for setting the moving speed of the screw 13 mounted within the injection cylinder, an input means 26b for setting the opening and closing speed of the mold 30, and in input means 25b for setting the stroke of the compression unit for setting the stroke position of the mold 30. Further, the controller 40 is arranged such that is may generate a signal to control a driving means 21c for the compression unit 21 which consists of the hydraulic cylinder 23, etc. for controlling the opening and closing speed of the mold, and a driving means 14c for the injection unit which consists of the cylinder 14, etc. for controlling the moving speed of the screw 13 mounted in the injection cylinder; that is; the injection speed (amount of injection) of the molten resin, respectively, in response to each of the signals detected relative to each of the values preset bu the input setting means; in other words; in response to each of the signals to be outputted when each of the detected values corresponds to the value set by each input setting means.

Figure 4:
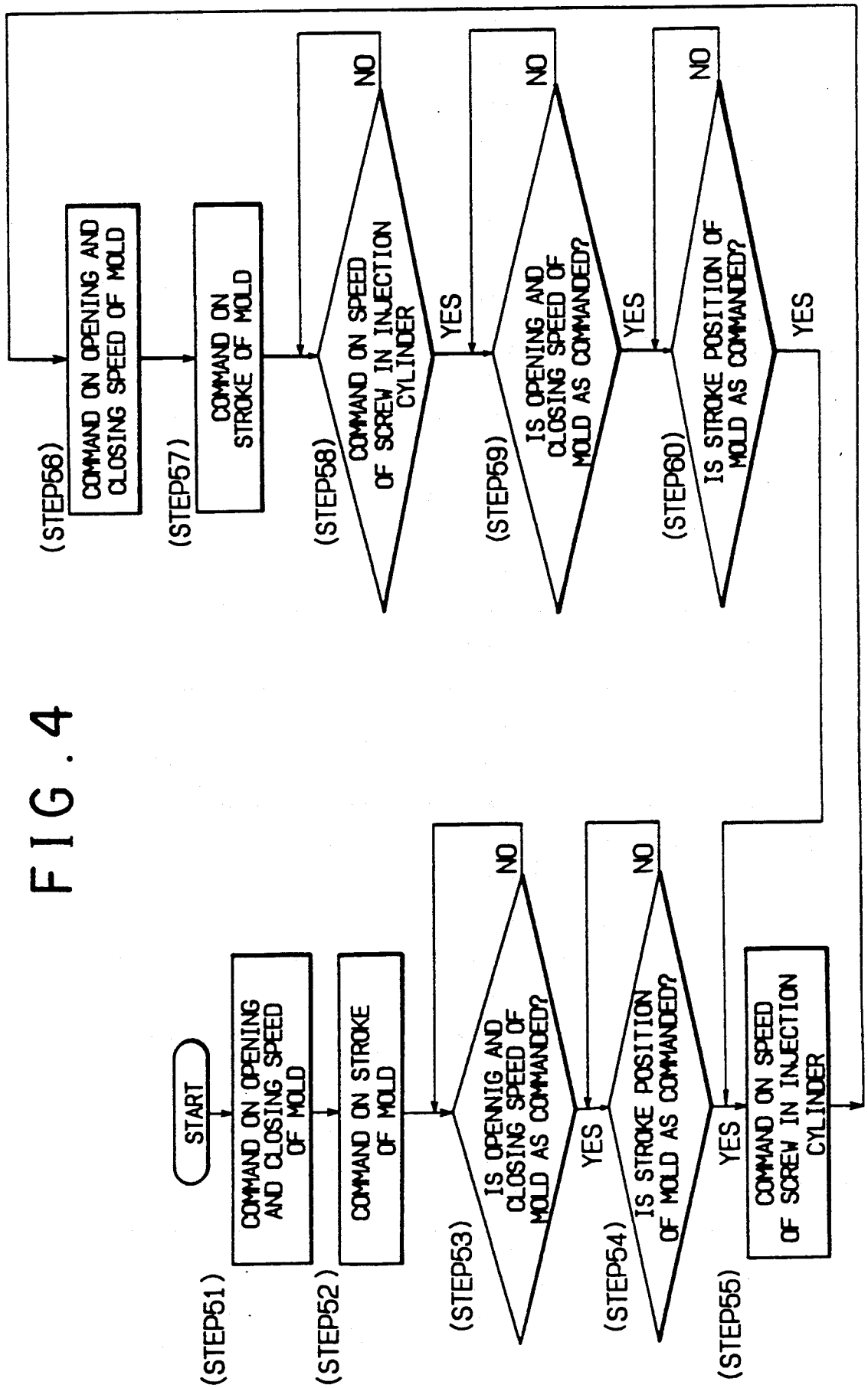
FIG. 4 is a flow chart showing a first embodiment of the method of molding according to the present invention.
Figure 5:
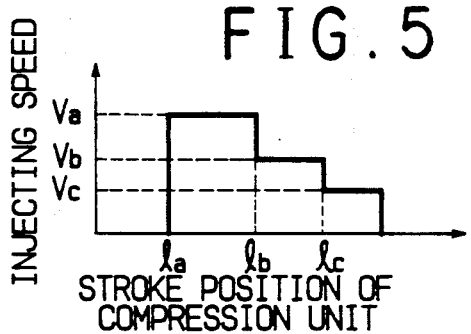
FIG. 5 is an explanatory regarding the operation of the embodiment as shown in FIG. 4.

The first embodiment of the method of molding by using the injection-compression molding machine having the above-mentioned construction will first be described below with reference to FIGS. 4 and 5.

The injection-compression molding machine 1 is started when the mold 30 is opened. With the start of the injection-compression molding machine 1, a command on the opening and closing speed of the mold (STEP 51), and a command of the stroke position of the mold (STEP 52) are given, and at STEPS 53 and 54 comparison between the current mold opening and closing speed and a commanded value, and comparison between the current stroke position of the mold and a command value, respectively, are made. When the current opening and closing speed and the current stroke of the mold become as commanded, a command on the speed of the screw 13 mounted within the injection cylinder (STEP 55) for determining the injection speed (Va) of molten resin matching the shape of a product to be molded (at position 1a in FIG. 5), a command on the opening and closing speed of the mold for the shape of a product to be molded next (STEP 56), and a command on the stroke position (lb) of the mold for continuing that command on the speed (STEP 57) are given.

STEPS 58, 59 and 60 are repeated until the moving speed of the screw mounted within the injection cylinder, the opening and closing speed and the stroke position of the mold become as commanded. When the three values have become as commanded, the system is returned to STEP 55 where commands on the next injection speed (Vb), the next mold opening and closing speed, and the next stroke position (lc) of the mold, all of which are matching the shape of a product to be molded next, are given.

The stroke position of the mold matching the shape of a product to be molded in inputted by the injection speed (amount of injection) setting input means, and the injecting speed of the molten resin inputted by the input means at the stroke position of the mold is changed, and then injection of the molten resin is made.

Figure 6:
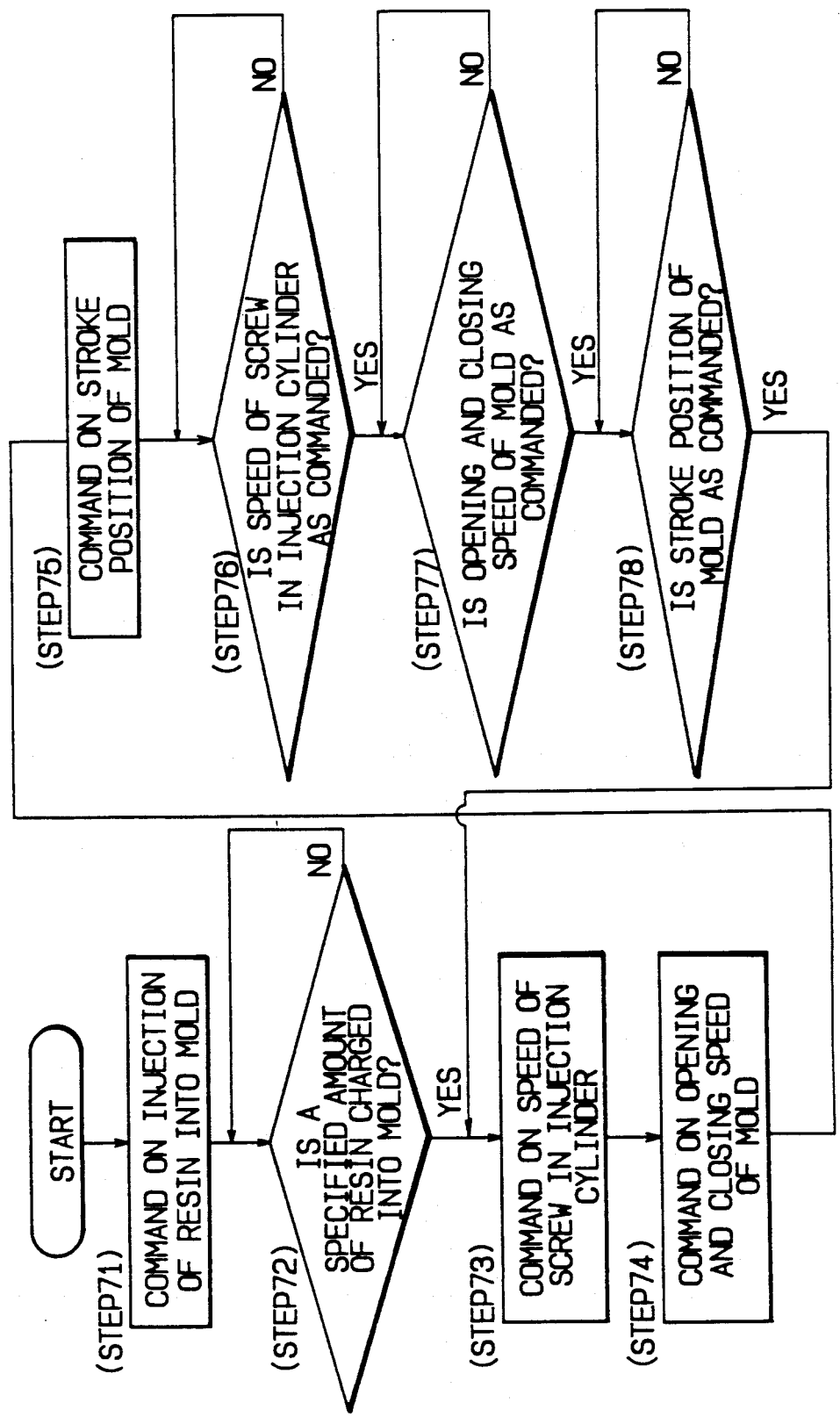
FIG. 6 is a flow chart showing a second embodiment of the method of molding according to the present invention.

In the next place, the second embodiment of the method of molding will be described with reference to FIG. 6. The injection-compression molding machine 1 is started, and a command on injection of the molten resin into the mold is given. (STEP 71).

At STEP 72, the amount of injection of the molten resin is measured by means of a position sensor for the injection cylinder such as the potentiometer 17, etc. attached to the injection cylinder 11. When a specified amount of the molten resin has been injected (STEP 72), the controller 40 will give a command on the moving speed of the screw mounted within the injection cylinder (STEP 73), a command on the opening and closing speed of the mold (STEP 74), and a command on the stroke position of the mold (STEP 75) in the same manner as in the case of the first embodiment, and then conduct the same control as that of the first embodiment. Further, in this case, the amount of injection of the molten resin by the injection unit may be determined by the moving speed of the screw and the timing for opening and closing of the mold preset by the clock oscillator.

In the above-mentioned first embodiment, the sequence among STEPS 55 to 57 and STEPS 58 and 59 may be changed.

Further, while in the above-mentioned embodiments a hydraulically actuated type press comprising a hydraulic cylinder is used as the press for the compression unit of the mold, a mechanical press of a crank type, or of a crankless type may be used instead. Further, while a screw is used in the injection-compression molding machine, it is needless to say that a plunger may be used alternatively.

While there is described hereinabove the example wherein the injection speed of the molten resin is varied in multiple stages in response to the stroke position of the molding unit, the arrangement may be made such that the injection speed can be varied continuously.

Figure 7:
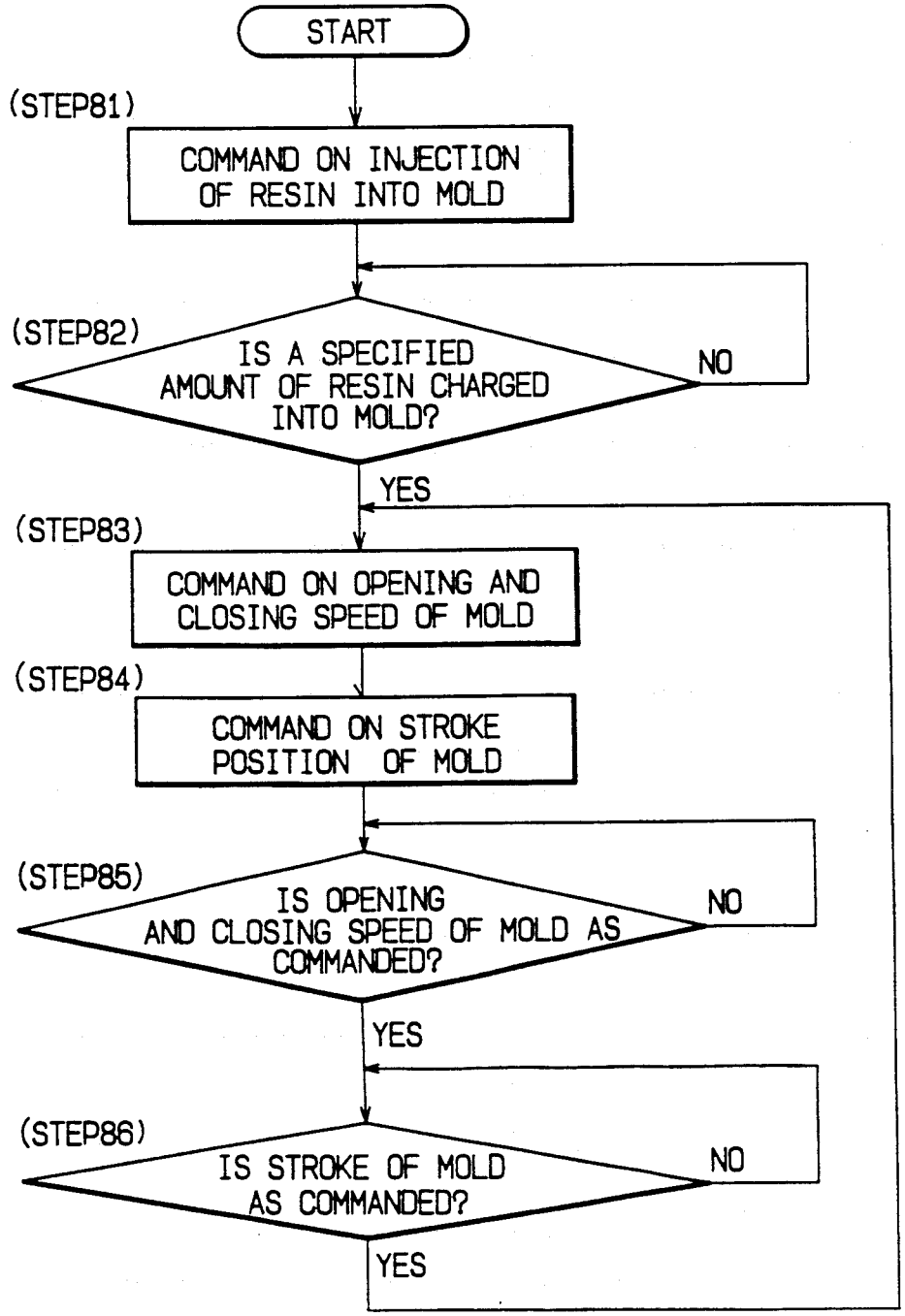

Subsequently, the third embodiment of the method of molding will be described with reference to FIG. 7.

The injection-compression molding machine 1 is started, and a command on injection of the molten resin into the mold 30 is given. (STEP 81)

At STEP 82, whether or not a specified amount of the molten resin has been injected into the mold 30 is judged by means of the means 25a for detecting the stroke of the mold 30. In case it is confirmed that a specified amount of resin has been rejected, the controller 40 will give a command on the mold opening and closing speed for pressurizing the molten resin and injecting it into the mold (STEP 83), and a command on the stroke position of the mold for changing the opening and closing speed of the mold at a position matching the shape of a product to be molded. (STEP 84). Whilst, in case a specified amount of the molten resin has not yet been injected, the above-mentioned operation is repeated until the mold is filled with a specified amount of the molten resin. Subsequently, STEPS 85 and 86 are repeated until the opening and closing speed and the stroke position of the mold become as commanded. When the opening and closing speed and the stroke position of the mold has reached their respective command values, the system will return to STEP 83 where a command on the next opening and closing speed of the mold inputted by the mold opening and closing speed input means 26b matching the shape of a product to be molded next is given.

Such STEPS are conducted in multiple stages in compliance with the shape of a product to be molded.

Next, the fourth embodiment of the method of molding will be described with reference to FIG. 8. The injection-compression molding machine 1 is started, and a command on injection of the molten resin into the mold 30 is given. (STEP 91)

At STEP 92, whether or not a specified amount of the molten resin has been injected into the mold is judged by means of the means 16a for detecting the injection speed of the resin by the injection cylinder such as the speed sensor 16, etc. fitted to the injection cylinder 11. When it is confirmed that a specified amount of resin has been injected into the mold, the controller 40 will give the compression unit driving means 21c a command on the opening and closing speed of the mold for pressurizing the molten resin so as to fill the mold with it (STEP 93), and also give the injection unit driving means 14c a command from the potentiometer 17 on the stroke position of the screw within the injection cylinder for changing the amount of the molten resin to be injected by the injection unit at a position of the screw matching the shape of a product to be molded. Whilst, in case a specified amount of the resin has not yet been injected, the above-mentioned operation is repeated until the mold is filled with the plastic resin. After that, STEPS 95 and 96 are repeated until the opening and closing speed of the mold and the amount of the molten resin injected by the injection cylinder become as commanded. When the opening and closing speed of the mold and the amount of the molten resin injected into the mold have reached their respective commanded values, the system will return to STEP 93 where a command on the next opening and closing speed of the mold matching the shape of a product to be molded next.

Next, the fifth embodiment of the method of molding will be described with reference to FIG. 9. The injection-compression molding machine 1 is started, and a command on injection of a molten resin into the mold 30 is given. (STEP 101)

At STEP 102, whether or not a specified amount of the molten resin has been injected into the mold is judged by means of the mold stroke detector means 25a such as the potentiometer 25 at the stroke position of the mold. When it is confirmed that a specified amount of the resin has been injected into the mold, at STEPS 103 and 104 the controller 40 will give commands similar to those at STEPS 94 and 95 in the fourth embodiment. Whilst, in case a specified amount of the resin has not yet been injected, the injection is made repeatedly until the mold is filled with a predetermined amount of resin.

At STEP 105, whether or not the opening and closing speed of the mold has become as commanded is detected by means of the means 26a for detecting the opening and closing speed of the mold, such as, the sensor 26 or the like, and the current opening and closing speed of the mold is compared with its commanded value by the controller 40. In case the current mold opening and closing speed has reached a commanded value, the system will move to STEP 106 where the current amount of the molten resin injected by the injection cylinder will be compared with its commanded value.

In case it is confirmed at STEP 106 that a commanded amount of the molten resin is injected, the system will return to STEP 103 where a command on the next opening and closing speed of the mold matching the shape of a product to be molded next.

In case it is confirmed at STEP 106 that a specified amount of the resin has not yet been reached, the system will return to STEP 105 where confirmation of the mold opening and closing speed is made, and at STEP 106 the amount of the resin injected by the injection cylinder is compared with its commanded value. STEPS 105 and 106 are repeated until a commanded amount of the molten resin has been injected into the mold.

Thus, the fifth embodiment is a combination of the third and fourth embodiments. It is also possible, according to the sequence reverse to that of the fifth embodiment, to detect previously the amount of the molten resin injected by the injection cylinder and then detect the amount of the resin charged into the mold thereby controlling the opening and closing speed of the mold. Whilst in the above-mentioned embodiments detection of the amount of the molten resin to be injected by the injection cylinder into the mold is made by detecting the stroke position of the molding or injection unit 21, it may be conducted according to the inflow speed and outflow speed of the resin and the timing of the opening and closing of the mold preset by the clock oscillator 44, which can be incorporated in each of the flow charts to conduct the control.

Further, regarding the configuration of the flow charts, it is possible to change return to which STEP in case the result is "NO", in FIGS. 8 and 9, or change the control sequence of STEPS 103 and 104, or change the control sequence so that STEPS 103 and 105 are previously performed, and then STEPS 104 and 106 are performed, as occasion demands.

We claim:

1. A method of molding a plastic resin comprising the steps of:
    opening a mold of an injection-compression molding machine, said injection-compression molding machine including a compression unit for clamping the mold and an injection unit for injecting a molten rein into the mold;
    setting a command for an opening and closing speed of the mold and setting a command for a stroke position of the mold;
    comparing a current mold opening and closing speed with the commanded opening and closing speed of the mold and comparing a current stroke position of the mold with the commanded stroke position of the mold;
    setting a command matching a shape of a product to be molded for an injection speed of the molten resin when the current opening and closing speed and the current stroke of the mold become as commanded; and
    injecting said molten resin from said injection unit into said mold in compliance with a filling speed of the molten resin within the mold so that the molten resin spreads uniformly therein as it is compressed in the mold by said compression unit.

2. The method of molding a plastic resin according to claim 1 further comprising the steps of:
    detecting the amount of the molten resin injected into said mold in said compression unit, and
    changing the injecting speed of the molten resin to be injected by said injection unit into said mold in compliance with the detected amount of the molten resin.

3. A method of molding a plastic resin comprising the steps of:

opening a mold of an injection-compression molding machine, said injection-compression molding machine including a compression unit for clamping the mold and an injection unit for injecting a molten resin into the mold;

measuring the amount of the molten resin in said injection unit;

setting a command for an injection speed of the molten resin into the mold;

setting a command for an opening and closing speed of the mold and setting a command for a stroke position of the mold;

comparing a current injection speed with the commanded injection speed, comparing a current mold opening and closing speed with the commanded opening and closing speed of the mold and comparing a current stroke position of the mold with the commanded stroke position of the mold; and injecting said molten resin from said injection unit into said mold in compliance with a filling speed of the molten resin within the mold when said current injection speed, said current mold opening and closing speed and said current stroke position are as commanded so that the molten resin spreads uniformly therein as it is compressed in the mold by said compression unit.

4. A method of molding a plastic resin comprising the steps of:

opening a mold of an injection-compression molding machine, said injection-compression molding machine including a compression unit for clamping said mold and an injection unit for injecting a molten resin into the mold;

injecting molten resin into said mold;

detecting the amount of molten resin in said mold;

comparing the amount of molten resin in said mold with a specified amount of molten resin;

setting a command for a mold opening and closing speed for pressurizing the molten resin if the specified amount of molten resin equals the detected amount of molten resin; and continuing to inject resin into the mold if the detected amount of molten resin is less than the specified amount of molten resin.

5. An injection-compression molding machine comprising:

a compression unit for opening and closing a mold;

an injection unit for injecting a molten resin into at least one cavity formed in the mold;

means for detecting a stroke of said compression unit;

means for detecting an injecting speed of said injection unit;

input means for setting the stroke of said compression unit;

input means for setting the injecting speed of said injection unit;

stroke signal generator means for converting said detected stroke of the compression unit into a stroke signal corresponding to a value preset by said stroke setting input means;

means for generating an injecting speed signal for said injection unit in response to said stroke signal;

injection unit driving means for driving said injection unit adapted to be actuated in response to the injecting speed signal;

controller means for controlling the injecting speed of the molten resin and the stroke of said compression unit, so that when the molten resin is injected by said injection unit into said mold as a result of actuation of said injection unit driving means, the injecting speed of the molten resin can be varied in compliance with the filling speed of the molten resin within the mold so that the molten resin spreads uniformly therein as it is compressed in the mold by said compression unit.

6. The injection-compression molding machine according to claim 5, further comprising means for detecting an opening and closing speed of said mold, input means for setting the opening and closing speed of said mold, and means for generating an opening and closing signal for said mold in response to the stroke signal.

7. The injection-compression molding machine according to claim 6, further comprising compression unit driving means for driving said compression unit adapted to be actuated in response to the stroke signal.

8. The injection-compression molding machine according to claim 5, wherein said injection unit includes an injection cylinder with a screw mounted therein, said screw being connected to a pair of pistons within corresponding cylinders through a bracket so that the screw may be slidably moved along a central axis of said injection cylinder so that the speed of said screw is proportionate to the injecting speed of the molten resin and is controlled by a discharge rate of pressurized fluid which is controlled by a flow rate controlling means, whereby molten resin in said injection cylinder is pressurized by the screw so that it may be injected through a flow passage into the mold.

9. The injection-compression molding machine according to claim 5, wherein said compression unit includes a piston mounted in a hydraulic cylinder for driving the compression unit, whereby the stroke of the compression unit and the pressure of the molten resin introduced to the mold are determined by the moving speed and the depressing force of the upper mold, which are controlled by the moving speed and the extruding force of the piston.

* * * * *